Jan. 27, 1970 C. F. AULT ET AL 3,492,670

POSITION SENSOR UTILIZING TWO PAIRS OF SERIALLY CONNECTED COILS

Filed Sept. 28, 1967 2 Sheets-Sheet 1

INVENTORS C. F. AULT
R. J. REDNER
BY D. E. Snedeker
ATTORNEY

POSITION SENSOR UTILIZING TWO PAIRS OF SERIALLY CONNECTED COILS

Filed Sept. 28, 1967 2 Sheets-Sheet 2

United States Patent Office 3,492,670

Patented Jan. 27, 1970

3,492,670

POSITION SENSOR UTILIZING TWO PAIRS OF SERIALLY CONNECTED COILS

Cyrus F. Ault, Wheaton, and Richard J. Redner, Glen Ellyn, Ill., assignors to Bell Telephone Laboratories, Incorporated, a corporation of New York Filed Sept. 28, 1967, Ser. No. 671,447

Int. Cl. G11b 5/00

U.S. Cl. 340—174.1 9 Claims

ABSTRACT OF THE DISCLOSURE

A position is sensed precisely by associating a bar magnet with the position and by detecting the centerpoint of a line between the magnet dipoles using a sensing device having two adjacent intercoupled signal translating gaps spaced apart a distance slightly less than the distance between the magnet dipoles.

BACKGROUND OF THE INVENTION

This invention relates to electromagnetic sensing devices and, now particularly, to such devices for use in position sensing apparatus and in displacement detection arrangements.

In the field of magnetic recording and reproduction, as well as in many other areas, it is often desired to determine accurately the position of a first device or equipment, such as a magnetic storage medium, with respect to the location of a second device or equipment, such as a magnetic transducer head. Thus, when information is to be recorded in a predetermined location on a storage medium, circuitry must be provided to sense when the predetermined location is adjacent the record transducer. Similarly, when recorded information is to be reproduced from a certain location on the medium it is necessary to sense that this location is adjacent the read transducer.

Such position sensing must be effected with a particularly high degree of accuracy where the storage medium comprises a plurality of discrete cells of magnetic material each of which is selectively magnetized in accordance with the character of a binary bit stored therein. A storage medium of this type is disclosed, for example, in S. M. Shackell application Ser. No. 708,127, field Jan. 10, 1958 and in an article entitled "A Card-Changeable Permanent-Magnet-Twister Memory of Large Capacity" published in the IRE Transactions on Electronic Computors, vol. EC-10, pp. 451–461, September 1961. Therein memory circuit arrangements are shown for providing storage of information through the use of removable cards having a plurality of small bar magnets bonded or deposited thereon. The cards are situated in the memory so that each bar magnet is in the proximity of a respective magnetic crosspoint element. If a magnet is in a magnetized condition the respective memory crosspoint element is thus biased by the static magnetic field of the magnet. When an interrogation signal is applied to a memory crosspoint, in the absence of a static magnetic field, an output signal is generated representative of a bit of one binary character. The presence of a static magnetic field due to a magnetized bar magnet, however, inhibits generation of an output signal from a crosspoint, which is representative of a bit of the other binary character. Accordingly, information is stored in the memory by selectively magnetizing the card magnets in a pattern in accordance with the binary bits of information to be stored. In the above S. M. Shackell application the magnetic crosspoint elements are magnetic cores, whereas in the above-mentioned "IRE Transactions" article the magnetic crosspoint elements are bit addresses of wire memory elements (twistors) of the type disclosed in A. H. Bobeck Patent 3,083,353 issued Mar. 26, 1963.

The magnets on each card in the above-described memories are arranged in closely-spaced rows and columns, each row corresponding to a word of information and each magnet corresponding to a binary bit thereof. In addition, the magnet cards advantageously include a plurality of additional magnets bonded or deposited thereon. Each additional magnet is individually associated with a row of bit magnets and is accurately located with respect thereto on the card. As will be described in detail below, the additional magnets are advantageously utilized in the present invention for positioning, or locating, the magnet cards with respect to recording circuitry during information storage operation.

Apparatus for storing information on the magnet cards one word at a time, that is, for selectively magnetizing the bar magnets of one row of bit magnets at a time, is shown in C. F. Ault-D. Friedman-R. H. Granger-J. J. Madden Patent 3,281,807 issued Oct. 25, 1966. Therein the rows of magnets on each card are sequentially presented to a row of magnetic record transducers which must be accurately positioned with respect to the magnets for recording. Position sensing apparatus in accordance with the present invention may advantageously be utilized to indicate to the recording circuitry precisely when the row of record transducers is adjacent a row of magnets in which information is to be stored. It is necessary that the position sensing be accomplished with considerable accuracy to minimize the possibility of the recording field of the transducers from infringing upon other rows of magnets and to insure that sufficient of the recording field of the transducers is provided to the proper magnets to magnetize them to a desired dipole saturation. Such accuracy must be maintained despite small variations which may occur in the length of the card magnets due to the edges being worn away or the like. Such variations may arise also, for example, during construction of the magnet cards where etching techniques are employed.

It is advantageous, moreover, that the position sensing be effected without substantial alteration of the magnet cards and with a minimum of additional apparatus or circuitry. Further, it is also advantageous that the sensing apparatus be simple and economical in construction and that the position indication provided thereby to the recording circuitry be independent of signal magnitude and amplifier gain variations. Prior position sensing apparatus of the type disclosed in C. F. Ault-S. F. Rise III Patent 3,295,117 issued Dec. 27, 1966, though generally satisfactory, was found to be disadvantageously dependent upon signal magnitude and amplifier gain variations.

SUMMARY OF THE INVENTION

Accordingly, it is an object of this invention to provide a simple, compact and economical sensing device for determining the relative position between two or more objects.

More particularly, it is an object of this invention to provide a simple, compact and economical device for accurately sensing the position of a transducer relative to a magnetic storage medium.

A further object of this invention relates to a sensing device for deriving a position indication from a magnet associated with a position.

Another object of this invention is to provide a sensing device for determining the center of a bar magnet independently of the edges thereof.

It is a still further object of this invention to provide a sensing device for accurately locating the centerpoint of a line between dipoles of a saturated magnetic material.

Yet another object of this invention relates to a sensing device for providing a position indication which is independent of signal magnitude and amplifier gain variations.

In accordance with a specific embodiment of our invention, the above and other objects are attained through the use of an electromagnetic sensing device which accurately detects a magnet associated with a position to be sensed. Thus, in recording information on magnet cards employed in the above-mentioned memory arrangements, for example, the additional or positioning magnets on the magnet cards are utilized advantageously for indicating the position of the associated rows of bit magnets with respect to a plurality of record transducers. As relative motion is imparted between the record transducers and the successive rows of bit magnets during recording, a sensing device in accordance with the principles of the present invention detects the center of each positioning magnet to trigger the recording of information in the associated row of bit magnets. The sensing device comprises three leg members of magnetic material which define two adjacent signal translating gaps separated by a distance slightly less than the distance between magnetic dipoles of the magnet to be sensed. A first output winding is serially coupled to both signal translating gaps and a second output winding is differentially coupled to the two gaps.

The two signal translating gaps are situated longitudinally along the line of relative motion between the sensing device and the magnets associated with the position to be sensed. That is to say, the line of relative motion between the sensing device and the position magnets is in a direction perpendicular to the width of the signal translating gaps. Relative motion between the sensing device and a magnet is such that the sensing device is successively adjacent the respective dipoles of the magnet. A pulse of predetermined polarity is thereby induced in the first winding when the two signal translating gaps of the sensing device are respectively adjacent the magnetic dipoles of the magnet. A polarity change or zero crossing signal is induced in the second winding when the two gaps are respectively adjacent the magnet dipoles and precisely centered over the magnet.

The pulse and the zero crossing thus derived jointly from both magnetic dipoles of the magnet are combined to accurately locate the center of the magnet independent of variations in the length of the magnet. The position indication produced thereby is not dependent on signal magnitude variations or amplifier gain variations and may be employed, for example, to effect the recording of information in the above-mentioned Ault-Friedman-Granger-Madden patent.

It is accordingly a feature of this invention that position sensing apparatus comprise a magnet fixedly associated with a position to be sensed and a sensing device including a pair of serially and differentially intercoupled signal translating gaps for providing a unique signal when the sensing device is centered over the magnet.

Another feature of this invention relates to a device for sensing the center of the line between dipoles of a magnetic material, the device comprising three leg members of magnetic material defining two adjacent signal translating gaps separated by a distance slightly less than the distance between dipoles of the magnetic material and common output circuitry serially and differentially coupled to both of the gaps.

BRIEF DESCRIPTION OF THE DRAWING

The above and other objects and features of the present invention may be better understood upon consideration of the following detailed description and the accompanying drawing in which.

DETAILED DESCRIPTION

An important aspect of the present invention, as mentioned above, relates to circuitry for accurately determining the position of a first object or equipment relative to the position of a second object or equipment. The illustrative embodiment set forth herein for purposes of describing the invention is concerned with sensing the position of a magnetic recording medium relative to magnetic recording circuitry. However, it will be apparent that the principles of our invention may be employed to advantage in a wide variety of applications; for example, in positioning arrangements for assembly and tooling operations. Further, a sensing device in accordance with our invention may be utilized advantageously in displacement detection arrangements to indicate displacement or disposition relative to a predetermined reference.

Figure 1:
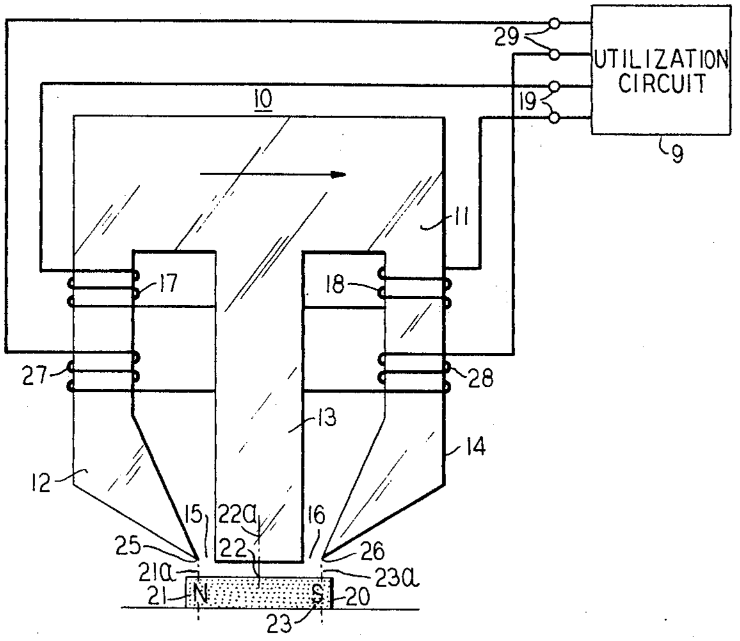
FIG. 1 is a representation of an illustrative embodiment of a sensing device in accordance with the principles of our invention.

Referring more particularly now to FIG. 1 of the drawing, a sensing device 10 in accordance with the principles of our invention is shown comprising a three-legged or E-shaped core of magnetic material 11 having three leg members 12, 13 and 14. Core 11 may be of laminated construction of any of the well known magnetic materials suitable for magnetic recording and reproducing purposes. For example, a sensing device 10 constructed of eight laminations of four mil 4–79 Permalloy may be employed advantageously in the illustrative embodiment of FIG. 3 described below. Leg members 12, 13 and 14 of sensing device 10 define a pair of adjacent signal translating gaps 15 and 16. Individual signal translating coils 17 and 18 disposed on leg members 12 and 14, respectively, are serially interconnected to form a common output winding connected to terminals 19, and thence to utilization circuit 9. Similarly, individual signal translating coils 27 and 28 disposed on leg members 12 and 14, respectively, are differentially interconnected to form a common output winding connected to terminals 29, and thence to utilization circuit 9.

As illustrated in FIG. 1 by way of example, sensing device 10 is employed to sense the position of a permanent bar magnet 20, the magnetic dipoles 21 and 23 of which are respectively indicated by center lines 21*a* and 23*a*. Center line 22*a* indicates the center 22 of magnet 20 and thus the center of a line between magnetic dipoles 21 and 23 of magnet 20. As discussed more fully hereinbelow, signal translating gaps 15 and 16 are separated by a distance slightly less than the distance between magnetic dipoles 21 and 23 of magnet 20. This condition is satisfied, for example, if the distance between the outermost pole tips 25 and 26 of gaps 15 and 16, respectively, is equal to the distance between magnetic dipoles 21 and 23, as shown in the illustrative embodiment of FIG. 1. Thus, when sensing device 10 is centered with respect to magnet 20 as shown in FIG. 1, gaps 15 and 16 are positioned similarly adjacent respective magnetic dipoles 21 and 23 of magnet 20.

For position sensing purposes, relative motion is imparted between sensing device 10 and magnet 20 in a direction perpendicular to the width of gaps 15 and 16. The width of gaps 15 and 16 is considered herein to be the dimension of the gaps measured into the drawing in FIG. 1. Thus, for purposes of describing the operation of FIG. 1, magnet 20 may be assumed to be in a stationary position and sensing device 10 may be assumed to move adjacent thereto in the direction indicated by the arrow. As sensing device 10 moves longitudinally in the direction indicated, a given point on magnet 20 is adjacent each of signal translating gaps 15 and 16 in succession. Therefore, each signal translating gap 15 and 16 of sensing device 10 passes adjacent first one of magnetic dipoles 21 and 23 of magnet 20 and then adjacent the other of magnetic dipoles 21 and 23 of magnet 20, thereby inducing three successive pulses of alternating polarity in the output winding connected to terminals 19.

Figure 2A:
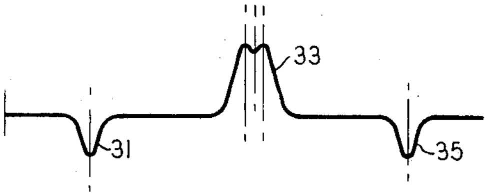
FIGS. 2A, 2B and 2C are graphical representations illustrating the operation of our invention.

A graphical representation of the output signal appearing at terminals 19 during position sensing operation is illustrated in FIG. 2A. Assume that prior to time $t_1$ sensing device 10 is approaching magnet 20 from the left in FIG. 1 of the drawing, moving in the direction assumed above. A time $t_1$ translating gap 16 passes adjacent magnetic dipole 21 of magnet 20 thereby inducing pulse 31 in translating coil 18 of the one output winding. At time $t_2$ translating gap 15 passes adjacent magnetic dipole 21 and a short interval thereafter, at time $t_4$, signal translating gap 16 passes adjacent magnetic dipole 23. Pulse 33 appearing at terminals 19 during the interval between times $t_2$ and $t_4$, therefore, is a combination of the signals induced in coils 17 and 18 by the magnetic flux coupling of gaps 15 and 16, respectively, and is opposite in polarity to pulse 31. Thus the magnitude of pulse 33 is approximately twice that of pulses 31 and 35. Pulse 35 is induced in coil 17 at time $t_5$, that is, when signal translating gap 15 passes adjacent magnetic dipole 23 of magnet 20.

Figure 2B:
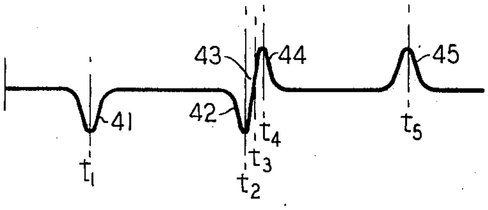

FIG. 2B shows a graphical representation of the output signal appearing at terminals 29 during position sensing operation. Again, assume that prior to time $t_1$ sensing device 10 is approaching magnet 20 from the left. At time $t_1$ gap 16 passes adjacent dipole 21 inducing pulse 41 in coil 28. At time $t_2$ gap 15 passes adjacent dipole 21 inducing pulse 42 in coil 27, and a short time thereafter at time $t_4$ gap 16 passes adjacent dipole 23 inducing pulse 44 in coil 28. Pulse 45 is induced in coil 27 at time $t_5$ as gap 15 passes adjacent dipole 23 of magnet 20. It will be noted that at time $t_3$ in FIG. 2B, when sensing device 10 is centered over magnet 20 as shown in FIG. 1, that is, when gaps 15 and 16 are positioned similarly adjacent respective magnetic dipoles 21 and 23, zero crossing 43 appears in the signal provided by coils 27 and 28 to terminals 29.

Accordingly, when signal translating gaps 15 and 16 of sensing device 10 are respectively adjacent magnetic dipoles 21 and 23 of magnet 20 during the interval between times $t_2$ and $t_4$ pulse 33 of predetermined polarity is induced in the output winding connected to terminals 19. During the same interval of time pulses 42 and 44 are induced in the output winding connected to terminals 29, with zero crossing 43 occurring at time $t_3$ during this interval when sensing device 10 is precisely centered over magnet 20.

Additional zero crossings may occur at various other times in the signal appearing at terminals 29 which do not correspond to the centering of device 10 over magnet 20. However, only zero crossing 43 occurs at terminals 29 concurrently with the appearance of pulse 33 of predetermined polarity at terminals 19. Thus, a precise position indication may be readily derived therefrom by simple circuitry in utilization circuit 9 for detecting the coincidence of pulse 33 at terminals 19 and zero crossing 43 at terminals 29.

As mentioned above, a sensing device in accordance with the principles of our invention may be employed advantageously in position sensing apparatus or recording systems of the type shown in the Ault-Friedman-Granger-Madden patent wherein information is stored on magnet cards for use in memory circuit arrangements of the type disclosed in the above-mentioned article and in the S. M. Shackell application. An illustrative embodiment of such position sensing apparatus is shown in block diagram form in FIG. 3.

Figure 3:
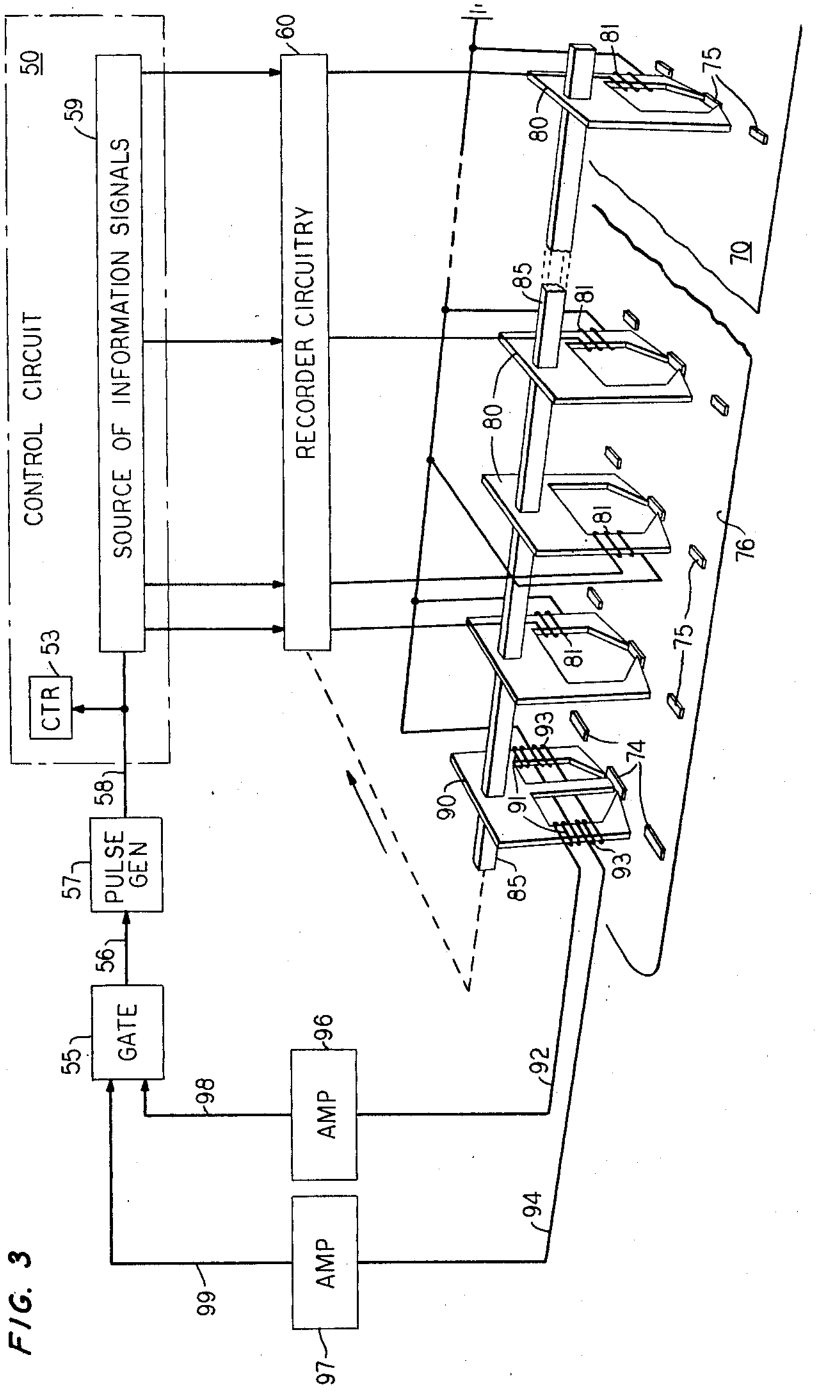
FIG. 3 shows an illustrative embodiment of position sensing apparatus in accordance with the principles of our invention employing the sensing device of FIG. 1.

A representation of a portion of a magnet card 70 is shown in FIG. 3 comprising a nonmagnetic sheet 76 having a plurality of positioning bar magnets 74 and a plurality of binary bit magnets 75 bonded or deposited thereon. The bit magnets 75 are arranged in rows and columns, each row corresponding to a word of information. An individual positioning magnet 74 is accurately located adjacent to and is associated with each respective row of bit magnets 75, positioning magnets 74 being arranged in a column parallel to the columns of bit magnets 75. Bit magnets 75 are selectively magnetized to record information on magnet cards 70. For this purpose assume that magnet card 70 remains stationary and that a plurality of recording heads 80 disposed on mounting rod 85 move with respect thereto, each recording head 80 moving adjacent a column of bit magnets 75. Thus, a particular bit magnet 75 in a row may be magnetized by applying a recording signal to winding 81 of a recording head 80 when it is adjacent to the particular bit magnet 75.

To insure that the recording signals are applied to windings 81 only when recording heads 80 are accurately positioned with respect to bit magnets 75, position sensing apparatus is provided. In accordance with the principles of our invention the position sensing apparatus derives an accurate position indication from the individual positioning magnets 74 associated with each row of bit magnets 75. Sensing device 90, which is substantially similar to sensing device 10 in FIG. 1, is in a fixed positional relationship with recording heads 80, such as being rigidly mounted therewith on mounting rod 85. Sensing device 90 moves adjacent the column of positioning magnets 74 as recording heads 80 move adjacent the columns of bit magnets 75. Apparatus for imparting movement to sensing device 90 and recording heads 80 is included in recorder circuitry 60.

As sensing device 90 moves adjacent one of positioning magnets 74, a signal is induced in winding 91, similar to that shown in FIG. 2A, and is applied via lead 92 to the input of amplifier 96. Amplifier 96 is responsive to pulses of a predetermined polarity corresponding to the polarity of the pulse induced in output winding 91 when sensing device 90 is situated adjacent the center of a positioning magnet 74, i.e., pulse 33 in FIG. 2A. The amplified pulse is applied by lead 98 to one input of gate 55.

Concurrently, as sensing device 90 moves adjacent one of positioning magnets 74, a signal is induced in winding 93 similar to that shown in FIG. 2B and is applied via lead 94 to the input of amplifier 97. Amplifier 97 is responsive to pulses of a predetermined polarity corresponding to the polarity of the pulse induced in output winding 93 when sensing device 90 is just moving past the center of a positioning magnet 74, i.e., pulse 44 in FIG. 2B. Thus, a signal appears on lead 99 to the other input of gate 55 when pulse 44 is induced in winding 93, the signal on lead 99 beginning at time $t_3$ and ending with the termination of pulse 44.

Figure 2C:
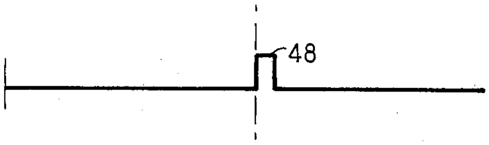

Gate 55, which may comprise AND gate circuitry, for example, provides a signal on lead 56 responsive to coincidence of the above-mentioned signals on leads 98 and 99, as graphically depicted by pulse 48 in FIG. 2C. The leading edge of pulse 48 thus occurs at time $t_3$ when sensing device 90 is centered over a magnet 74, and pulse generator 57 is responsive thereto to provide a position indication signal on lead 58 suitable for operating control circuit 50.

Control circuit 50 comprises a source of information signal 59 which may include any source presenting information signals to be recorded on magnet card 70. The signal translating windings 81 of each of recording heads 80 are connected to source 59 through recorder circuitry 60. Thus, responsive to a gating signal on lead 58, source 59 selectively energizes windings 81 in accordance with the information to be stored in a row of magnets 75. If the fixed positional relationship of sensing head 90 and recording heads 80 is such that when the position indication signal appears on lead 58 recording heads 80 are situated adjacent a row of bit magnets 75, then the position indication signal on lead 58 may be employed directly to gate the operation of source 59 as shown in FIG. 3. Otherwise, suitable delay circuitry may be interposed between source 59 and pulse generator 57.

Each position indication signal on lead 58 may be applied also to a counter 53 to provide an indication of the particular row of bit magnets 75 which recording heads are situated adjacent. Thus the count in counter 53 advantageously indicates the position of recording heads 80 relative to an initial reference position.

What is claimed is:

1. A transducer for detecting the center point of a line between a pair of opposite magnetic poles comprising, three leg members of magnetic material defining two adjacent signal translating gaps separated by a distance slightly less than the distance between said magnetic poles, first circuit means operatively connected to both of said gaps for providing a distinctive pulse when said gaps are centered over said line center point, second circuit means operatively connected to both of said gaps for providing a zero crossing signal when said gaps are centered over said line center point and output means responsive to the concurrence of said distinctive pulse and said zero crossing signal.

2. A transducer in accordance with claim 1 further comprising means for imparting longitudinal movement to said gaps adjacent said line between said poles.

3. A transducer in accordance with claim 2 wherein said movement imparting means comprises means for moving said transducer such that said gaps each pass adjacent said magnetic poles in succession and wherein said firt and second circuit means respectively comprise first and second output windings each inductively coupled to both of said gaps.

4. A transducer in accordance with claim 3 wherein said first output winding comprises a pair of serially connected windings individually coupled to respective ones of said gaps and wherein said second output winding comprises a pair of differentially connected windings individually coupled to respective ones of said gaps.

5. Position sensing apparatus comprising, a discrete cell of magnetic material having two magnetic poles separated by a first distance, said magnetic poles being accurately located with respect to a position to be sensed; a sensing device having three leg members of magnetic material defining first and second adjacent signal translating gaps, the distance between said adjacent gaps being less than said first distance; means for moving said sensing device adjacent said discrete cell of magnetic material; and output means including first and second means each inductively coupled to both of said gaps, said first means providing a first output signal when said signal translating gaps are individually adjacent respective ones of said two magnetic poles, and said second means providing a second output signal when said signal translating gaps are individually adjacent respective ones of said two magnetic poles.

6. Position sensing apparatus in accordance with claim 5 wherein said moving means comprises means for moving said sensing device adjacent said two magnetic poles in succession, the direction of movement being substantially perpendicular to the width of said first and second signal translating gaps.

7. Position sensing apparatus in accordance with claim 6 wherein said first means comprises a first pair of windings individually coupled to respective ones of said gaps and means serially interconnecting said first pair of windings, and wherein said second means comprises a second pair of windings individually coupled to respective one of said gaps, and means differentially interconnecting said second pair of windings.

8. Position sensing apparatus in accordance with claim 5 wherein said first means comprises an output winding inductively coupled to said gaps so as to provide a distinctive polarity signal as said first output signal when said gaps are individually adjacent respective ones of said poles and wherein said second means comprises an output winding coupled to said gaps so as to provide a zero crossing signal as said second output signal when said gaps are individually adjacent respective ones of said poles.

9. Position sensing apparatus in accordance with claim 8 wherein said output means further comprises means responsive to the coincidence of said distinctive polarity signal and said zero crossing signal to provide a position indication signal.

References Cited

UNITED STATES PATENTS

| | | | |
|---|---|---|---|
| 3,176,241 | 3/1965 | Hogan et al. | 179—100.2 |
| 3,246,219 | 4/1966 | Devoi et al. | 340—174.1 |
| 3,295,117 | 12/1966 | Auir et al. | 340—174.1 |

JAMES W. MOFFITT, Primary Examiner

VINCENT P. CANNEY, Assistant Examiner

U.S. Cl. X.R.

179—100.2; 346—74